United States Patent [19]

Noyes

[11] 4,248,332
[45] Feb. 3, 1981

[54] FLUID GEAR COUPLING

[76] Inventor: Wilfred C. Noyes, Rte. 1, Box 298A, Newberg, Oreg. 97132

[21] Appl. No.: 32,146

[22] Filed: Apr. 23, 1979

[51] Int. Cl.³ .................. F16D 31/04; F16D 43/24
[52] U.S. Cl. .......................... 192/61; 192/103 FA; 192/105 F
[58] Field of Search .............. 192/61, 103 FA, 105 F, 192/58 R, 59, 60

[56] References Cited

U.S. PATENT DOCUMENTS

| | | | |
|---|---|---|---|
| 2,281,292 | 4/1942 | Hoover | 192/61 |
| 2,329,564 | 9/1943 | Corrigan | 192/61 |
| 2,377,350 | 6/1945 | Marsch | 192/61 |
| 2,418,625 | 4/1947 | Cornelius | 192/61 |
| 2,644,561 | 7/1963 | Dikeman | 192/61 |
| 2,730,218 | 1/1956 | Wickman | 192/61 |

Primary Examiner—Allan D. Herrmann
Attorney, Agent, or Firm—Bachman and LaPointe

[57] ABSTRACT

The present invention is drawn to a fluid gear coupling in which the lock up RPM between the drive member or power input shaft and the driven member or power output shaft is variable depending on the torque or power applied to the drive member or power input shaft. The present invention employs valves on the drive member which close off the exit ports of a pump disposed between the drive member and the driven member which are responsive to both pressure and centrifugal force. In the preferred embodiment of the present invention, check valves are provided in the main inlet ports of the pump along with auxiliary inlet ports so as to brake the device and prevent freewheeling upon deceleration.

10 Claims, 9 Drawing Figures

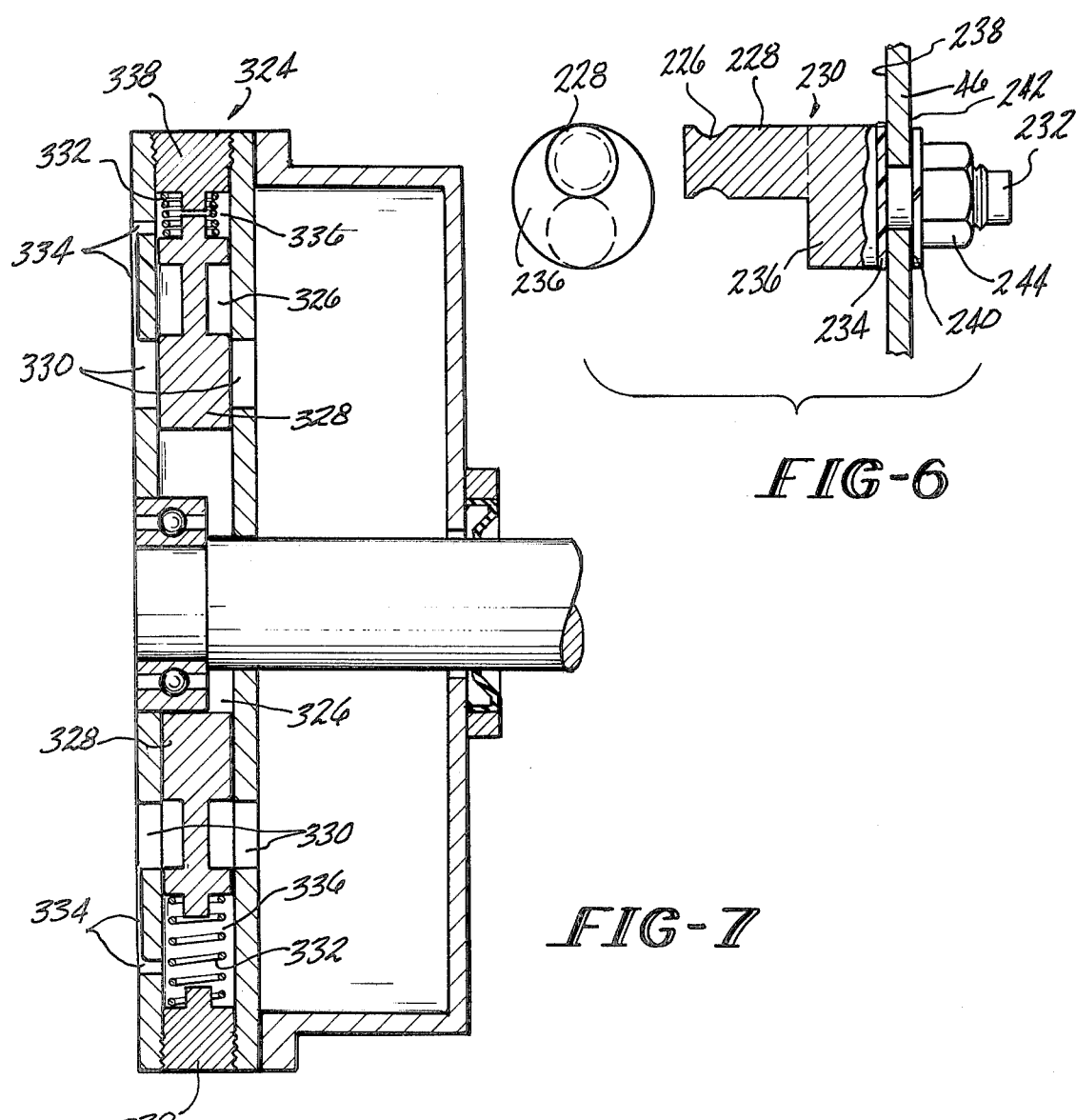

FLUID GEAR COUPLING

BACKGROUND OF THE INVENTION

The present invention relates to a fluid coupling and more particularly a fluid coupling which transmits power between a power input shaft and a power output shaft. The fluid coupling of the present invention has particular utility in automotive vehicles and machine tool drive mechanisms or any other installation requiring power transmissions.

Fluid couplings per se are known in the art and have been extensively used in power transmissions. A typical coupling device is disclosed in U.S. Pat. No. 1,954,418 wherein the discharge valving of the device is manually controlled. When the discharge ports are uncovered no power is transmitted from the drive member to the driven member. As the valve is moved so as to throttle the discharge ports power is transmitted from the drive member to the driven member. When the valve completely covers the discharge ports the drive and driven members rotate in unison in 1:1 ratio.

U.S. Pat. No. 3,696,896 discloses a fluid coupling having centrifugally actuated valving for controlling the discharge ports. Such a device suffers from the disadvantage that the drive and driven members are locked in 1:1 ratio at a specific RPM of the drive member. Thus, at a RPM less than the specific lock up RPM the relative movement between the drive and driven members would result in heat build up and wear thereby adding to servicing costs of the device. In addition to the foregoing, upon deceleration, the device would freewheel thereby offering no braking action.

In order to overcome the aforenoted disadvantages, it would be highly desirable to design a fluid coupling in which the lock up RPM between the drive and driven members is variable depending on the torque or power applied to the drive member. By providing such a device, at ordinarily operating ranges of speed the unit will be locked in 1:1 ratio thereby minimizing wear and heat build up and correspondingly servicing costs.

Accordingly, it is the principal object of the present invention to provide a fluid coupling device which is of simple construction and less complex than automatic transmissions known in the art.

It is a particular object of the present invention to provide an improved fluid coupling device in which the lock up RPM between the drive member and the driven member is variable depending on the torque and RPM applied to the drive member.

It is a still further object of the present invention to provide an improved fluid coupling device in which freewheeling is eliminated upon deceleration of the device.

Further objects and advantages of the present invention will appear hereinbelow.

SUMMARY OF THE INVENTION

In accordance with the present invention the foregoing objects and advantages are readily obtained.

The present invention provides a fluid coupling device which is of simple construction and less complex than known prior art automatic transmissions. The fluid coupling of the present invention has a variable 1:1 ratio lock up RPM between the drive member and the driven member which is variable in response to the torque and RPM applied to the drive member.

In accordance with the present invention, a fluid coupling device employs a pump between the drive member and the driven member. Valve means with control weights are provided on the gear housing which is integral with the drive member for restricting the flow of fluid from the outlet of the pump thereby transmitting power from the drive member to the driven member. The valve means are responsive to both the pressure of the fluid being pumped and the centrifugal force exerted on the valve control weights by the RPM of the drive member so as to enable the drive member and driven member to be locked up in 1:1 ratio at different RPM. In the preferred embodiment of the present invention, check valves are provided in the main inlet ports of the pump along with auxiliary inlet ports so as to allow for a braking of the device upon deceleration of the drive member.

Accordingly, it is seen that the present invention provides an improved device for transmitting power from a drive member to a driven member which is of simpler construction than automatic transmissions heretofore known. The present invention, as indicated above, provides considerable advantages in the field of transmissions. Thus, for example, the device of the present invention provides a fluid coupling which allows for 1:1 ratio lock up at variable RPM thereby eliminating overheating and wear and therefore correspondingly lowers the costs of servicing the device over known fluid coupling devices. In accordance with the preferred embodiment of the present invention, when a check valve is employed in the inlet port with secondary inlet ports, freewheeling of the device is overcome thereby allowing for a braking of the device upon deceleration of the drive member.

Further objects and advantages of the present invention will be apparent after consideration of the ensuing detailed description.

BRIEF DESCRIPTION OF THE DRAWINGS

FIGS. 4A, 4B and 4C illustrate an inlet check valve employed in the fluid couplings of the present invention.

FIG. 6 is a fragmentary sectional side view illustrating a spring tension adjusting mechanism for use in the fluid coupling of FIGS. 1 through 3.

FIG. 7 is a sectional side view illustrating a second embodiment of valve means of the present invention.

DETAILED DESCRIPTION

Figure 1:
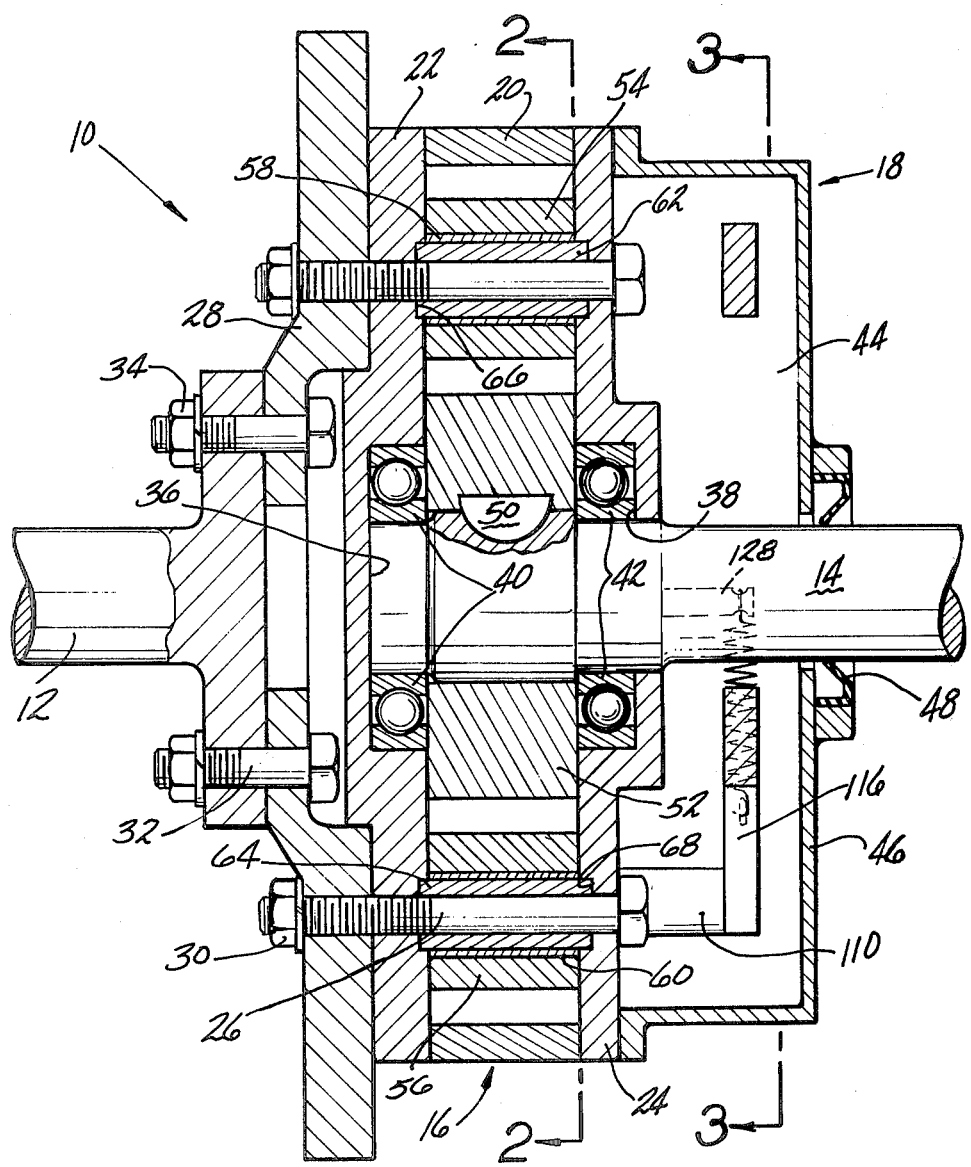
FIG. 1 is a side sectional view of a first embodiment of a fluid gear coupling in accordance with the present invention.
Figure 2:
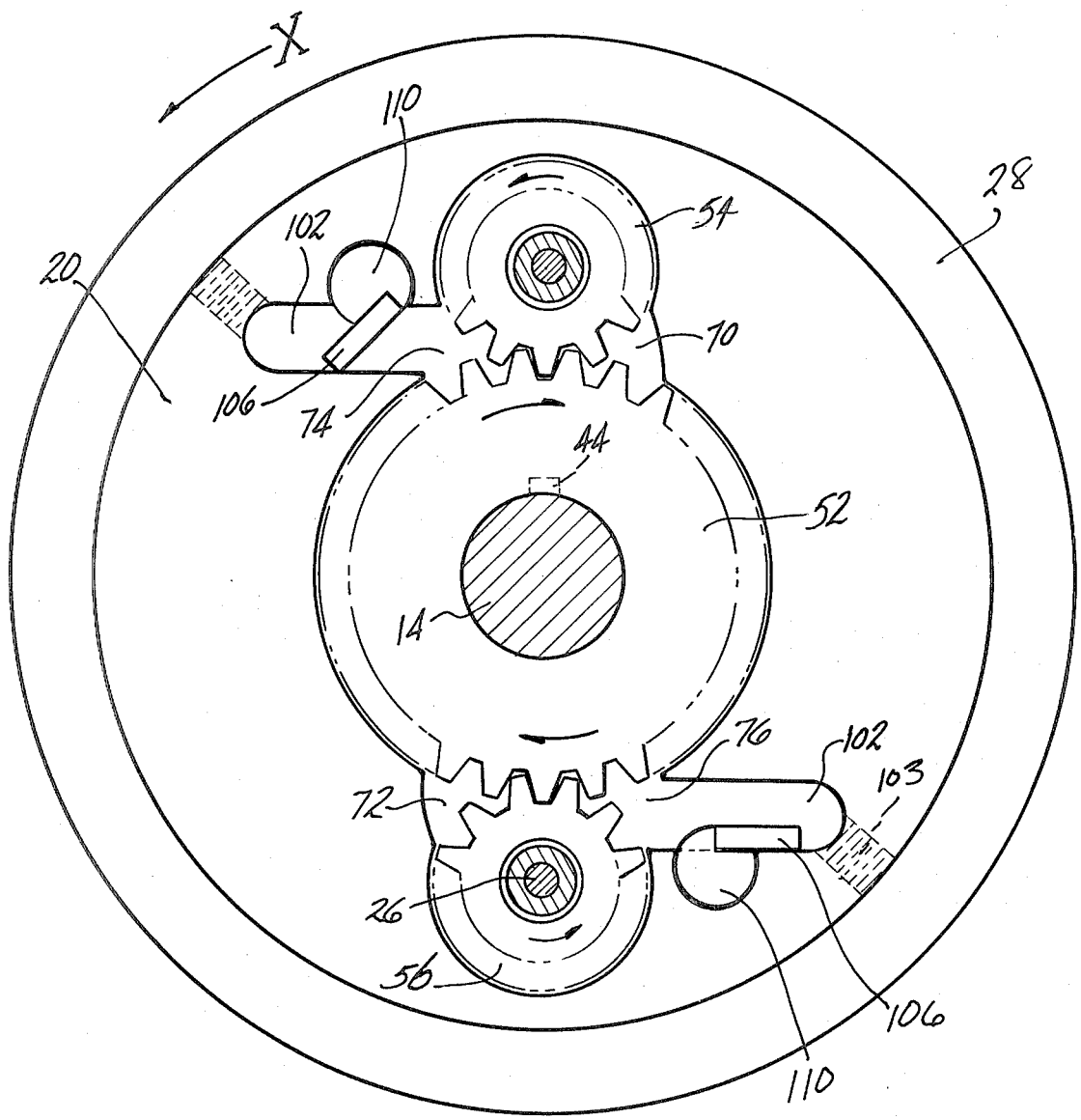
FIG. 2 is a sectional view taken along line 2—2 of FIG. 1.
Figure 3:
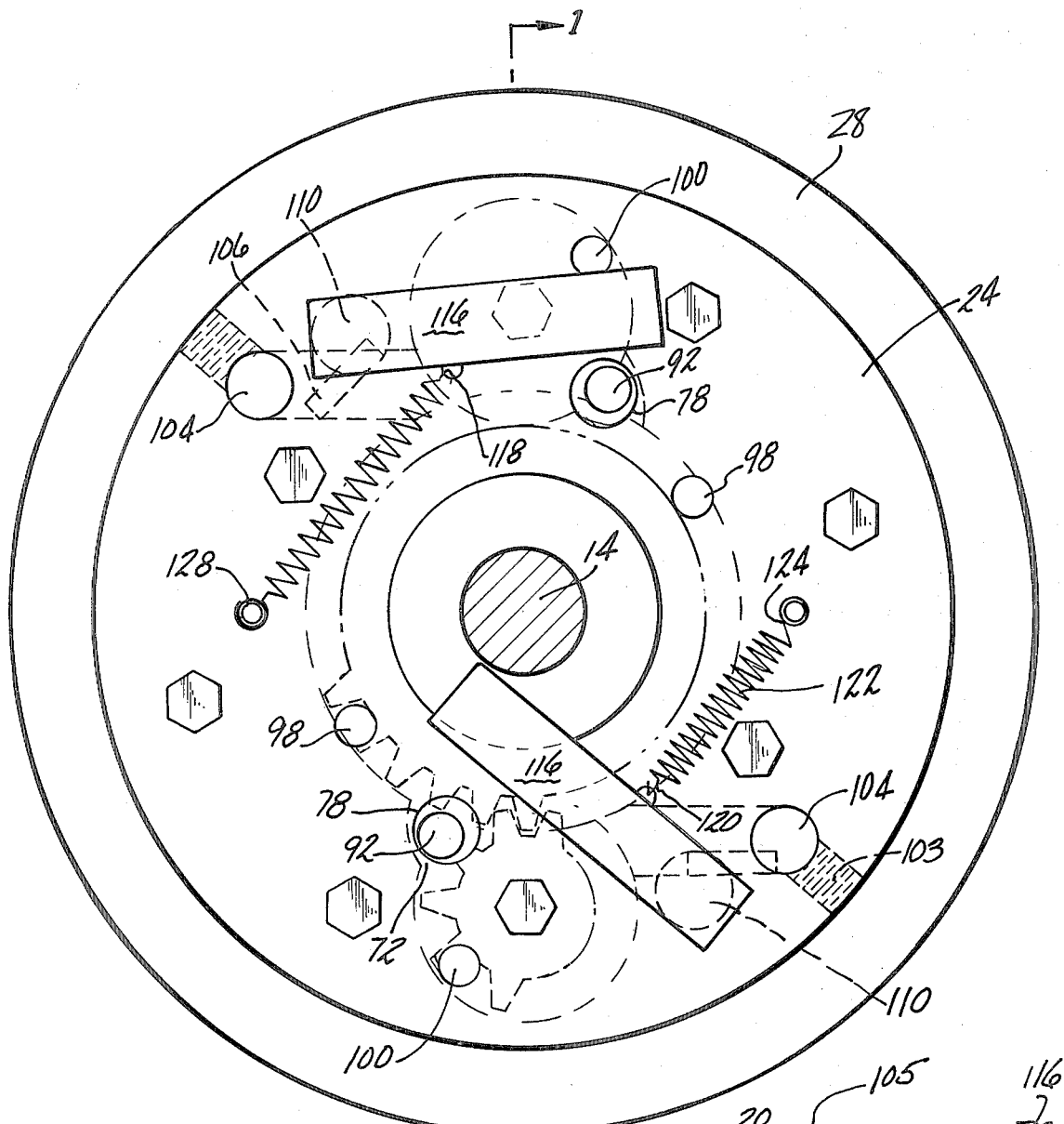
FIG. 3 is a sectional view taken along line 3—3 of FIG. 1.

Referring to FIGS. 1 through 3, a fluid gear coupling 10 is illustrated through which power is transmitted from a drive member 13 to a driven member 14. The fluid gear coupling 10 comprises a gear housing 16 and a fluid housing 18. The gear housing 16 consists of a gear case 20 sandwiched between a pair of parallel spaced apart end plates 22 and 24. The gear case 20 and end plates 22 and 24 are secured together by means of a plurality of bolts 26 which project through the end plates 22 and 24 and are secured to a fly wheel 28 by means of nuts 30. The fly wheel 28 in turn is secured to drive member 12 by bolts 32 and nuts 34. It should be appreciated that appropriate sealing means, not shown, is provided between the gear case 20 and the end plates 22 and 24, respectively, so as to form a fluid tight seal. The seal may be in the form of an O-ring positioned in a circular groove in gear case 20 and end plates 22 and 24, respectively. Fluid housing 18 is secured to end plate 24 of gear housing 16 in any suitable manner such as welding, bolts or the like so as to form a unitary fluid tight structure with the gear housing 16, fly wheel 28 and drive member 12. Thus, as is evident, rotation of the drive member 12 results in the rotation of fly wheel 28, gear housing 16 and fluid housing 18.

End plates 22 and 24 are each provided with a recess, 36 and 38 respectively, which receive a pair of roller or ball bearings 40 and 42 on which driven member 14 is journalled. Driven member 14 extends through fluid chamber reservoir 44 of fluid housing 18 and out back wall 46 where seal 48 sealingly engages member 14. Fixedly mounted on driven member 14 by way of key 50 is sun gear 52 which is adapted to mesh with a plurality of planetary gears 54 and 56. Planetary gears 54 and 56 with bearings 58 and 60, respectively, are mounted for rotational movement on and relative to bushings or hollow spindles 62 and 64 through which the bolts 26 extend. The bushings 62 and 64 are secured by frictional press fit in recesses 66 and 68 provided in end plates 22 and 24, respectively.

As can best be seen with reference to FIGS. 2 and 3, as drive member 12 is rotated such that fly wheel 28, gear housing 16 and fluid housing 18 revolve in the direction of arrow X, planetary gears 54 and 56 will rotate, as indicated by the respective arrows, on sun gear 52. As the planetary gears 54 and 56 rotate on sun gear 52 each will form an expansion chamber 70 and 72, respectively, and a pumping chamber 74 and 76, respectively, at points adjacent the intermeshing teeth of the respective planetary gear 54 or 56 and sun gear 52. Fluid is communicated to the expansion chambers 70 and 72 from chamber 44 of fluid housing 18 by means of ports 78 which extend through end plate 24. The ports 78 in end plate 24 are each adapted to receive one way inlet check valve assemblies 80 as illustrated in FIGS. 4A, 4B and 4C by means of press fit. The inlet check valve assemblies 80 comprise a stepped cylinder 82 having a first diameter 84 and a second diameter 86 larger than first diameter 84. First portion 84 of cylinder 82 is pressed fit into ports 78 in end plate 24 and secured in place by a set screw, spot welding or the like such that second portion 86 projects into chamber 44 of fluid housing 18. Cylinder 82 is provided with an internal blind bore 88 extending from each of the expansion chambers 70 and 72 toward wall 90 of valve assembly 80. The wall 90 is provided with an offset port 92 which communicates with the fluid in chamber 44 of fluid housing 18. For reasons to be expounded on hereinbelow the valve assembly 80 is positioned and secured in ports 78 of end plate 24 such that the port 92 is at the greatest radial diameter from the center of rotation of drive member 12 and driven member 14. A ball 94 is positioned in bore 88 of cylinder 82 between offset port 92 and a cross pin 96 provided in the bore 88. Thus, it can be seen that the valve assembly 80 will not block flow of fluid from chamber 44 of fluid housing 18 to expansion chambers 70 and 72 but may, as will be made clear hereinbelow, block reverse flow from the expansion chambers 70 and 72 to fluid chamber 44 in fluid housing 18. With reference to FIG. 3, a pair of auxiliary ports 98 and 100 are provided proximate to and on either side of ports 78 for communicating fluid chamber 44 with the sun gear 52 and planetary gears 54 and 56. It is preferred that the auxiliary inlet ports 98 and 100 be spaced a distance of at least two gear teeth from the ports 78. As will be explained in more detail hereinbelow, the auxiliary ports 98 and 100 insure an adequate supply of fluid for regular operation of the coupling as well as adequate fluid for braking the device so as to prevent freewheeling of same.

Figure 5:
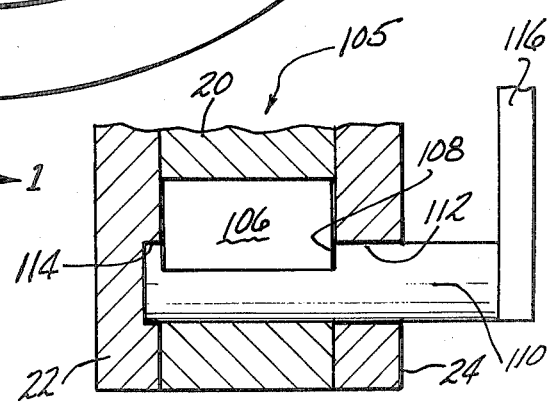
FIG. 5 is a fragmentary sectional view illustrating the valve assembly employed in the embodiment of FIGS. 1 through 3.

Referring again to FIGS. 2 and 3, pumping chambers 74 and 76 each communicate with fluid chamber 44 in fluid housing 18 by means of outlet channels 102 milled in gear casing 20 and cross bores 104 which extends through end plate 24 into chamber 44. Positioned within outlet channels 102 upstream of cross bores 104 are valve assemblies 105 each comprising a flap valve 106 which controls the flow of fluid from pumping chambers 74 and 76 to the fluid chamber reservoir 44. As can best be seen in FIG. 5, each flap valve 106 of valve assembly 105 is secured in a recess 108 in a cylindrical rod 110 by spot welding. The cylindrical rod 110 projects through hole 112 in end plate 24 and is journalled for rotational movement on bearings or the like, not shown, in blind bore 114. Suitable sealing means are provided on rod 110 so as to effectively seal hole 112. With reference to FIGS. 3 and 5, the valve assemblies 105 have secured thereto by any suitable means at the free end of rod 110 a weight 116 for reasons to be made clear hereinbelow. Weight 116 is provided with a ring 118 adapted to receive under tension one end 120 of a spring 122 whose other end 124 is received in a groove 126 formed on pin 128 which projects out of end plate 24 toward back wall 46 of fluid housing 18. For purposes of illustration only, the valve flaps 106 are illustrated in both their open and closed positions in FIGS. 2 and 3.

In accordance with the principles of the present invention as illustrated in the embodiment of FIGS. 1 through 5, the discharge valve assemblies 105 are sensitive to both fluid pressure in pumping chambers 74 and 76 as well as being responsive to the centrifugal force created on the valve control weights by the speed of rotation of drive member 12 and correspondingly the speed of rotation of gear housing 16 and fluid housing 18.

In operation, as the drive member 12 is rotated at idle speed, for example, 500 RPM, the flap valves 106 under the tension of springs 122 remain fully opened thereby allowing the fluid in chamber 44 to freely circulate into expansion chambers 70 and 72 through inlet port 78 around gears 54 and 56 to pumping chambers 74 and 76 to outlet channels 102, cross bores 104 and back to fluid chamber 44. As the fluid is allowed to circulate freely, no pressure is created on opposite sides of sun gear 52 and no torque is transferred to sun gear 52. Therefore, the sun gear 52 is stationary and no power is transmitted from drive member 12 to driven member 14. As torque is applied to the drive member 12 thereby increasing the RPM of the gear casing 20 the flap valves 106 are urged from their open position toward a closed position by means of weights 116 under the urge of the centrifugal force generated by the rotation of the gear casing 20. As the flap valves 106 begin to close and restrict circulation of the fluid through outlet 102 a pressure build up occurs in the pumping chambers 74 and 76 which reacts on sun gear 52 to set the same in motion. It should be noted that as the valves are urged to their closed position as a result of centrifugal force they are also responsive to the pumped fluid pressure which tends to urge them in an open position. As the RPM of the drive member 12 is increased the flap valves 106 will continue to close thereby further restricting the flow of pumped fluid from the pumping chambers 74 and 76, the result being an increase of pressure on sun gear 52 thereby transmitting more power thereto. As the RPM of the input shaft is increased up to a point of full throttle, for example 3000 RPM, the flap valves 106 will be completely closed thereby prohibiting any flow of pumped fluid from pumping chambers 74 and 76. At this point, full throttle and maximum torque, the fluid coupling would experience full lock up thereby resulting in a 1:1 ratio drive between the drive member 12 and the driven member 14. In accordance with the present invention, as a result of the flap valves 106 being responsive to both the centrifugal force created on the valve control weights by the rotation of the gear casing 20 as well as the pressure of the fluid being pumped, the RPM to the drive member 12 may be reduced, for example to 1500 RPM, and the fluid coupling will still remain in a locked 1:1 ratio drive as long as the fluid pressure in chambers 74 and 76 is not sufficient to overcome the centrifugal force created on the valve control weights which urge the valves to their closed position. This is due to the fact that a reduction in torque to drive member 12, while reducing the RPM and correspondingly the amount of force urging the valves 106 to a closed position, also reduces the pressure in chambers 74 and 76 acting to open the valves 106.

When additional torque is then applied to drive member 12 an increase in pressure occurs which opens valves 106 taking the coupling out of 1:1 drive until, at full throttle, i.e. 3000 RPM, the unit is again locked in 1:1 drive ratio. Thus, by providing outlet valves which are both sensitive to centrifugal force and the pressure of the pumped fluid, the fluid gear coupling of the present invention may be locked up at 1:1 ratio between the drive member and the driven member at a variable RPM.

A further feature of the fluid coupling of the present invention resides in the inlet valve assemblies 80 as well as the auxiliary inlet ports 98 and 100. As noted previously, the position of port 92 on the inlet valve assembly 80 and the location of the inlet valve assembly 80 in the end plate 24 is such that the centrifugal force will neither seat nor restrict the ball 94 from opening or closing the port 92. In accordance with the present invention, in order to eliminate freewheeling of the fluid coupling upon deceleration of drive member 12 valve assembly 80 is such that upon deceleration when the sun gear 52 attempts to overrun the planetary gears 54 and 56 the ball 94 would seat in outlet port 92 thereby preventing fluid from being pumped out of chambers 70 and 72. This build up of fluid in chambers 70 and 72 acts as a pressure on sun gear 52 thereby braking the same and preventing freewheeling thereof. To assure adequate fluid for this braking operation auxiliary ports 98 and 100 are provided so as to supply fluid to the fluid coupling. Thus, the arrangement of valve assembly 80 allows for a braking action upon deceleration of the drive member 12 thereby eliminating freewheeling of the fluid coupling. It should be noted that auxiliary inlet ports 98 and 100 also assure an adequate supply of fluid to the fluid coupling during the normal operation thereof.

Fluid is supplied to chamber 44 of fluid housing 18 via port 103 provided in the periphery of gear casing 20. It should be noted that the fluid chamber 44 should be of sufficient size so as to assure an adequate supply of fluid for cooling the surfaces of the fluid coupling. If desired, cooling fins may be provided on fluid housing 18 to aid in cooling the pumped fluid. In addition, while the device of FIGS. 1–3 is shown employing two planetary gears it should be appreciated that more planetary gears may be employed such as four or more as long as the device remains balanced. In addition to the foregoing, a manual override may be employed with the fluid coupling for controlling the opening and closing of the valve flaps 106 thereby overriding the automatic opening and closing thereof.

FIG. 6 illustrates an alternative embodiment of spring holding pin for that pin 128 illustrated in FIGS. 2 and 3. In accordance with the present invention, spring pin 228 is mounted, in an offset manner, on head and bolt member 230 which is provided with a partially threaded leg portion 232 having flat sides on the free end thereof which projects through back wall 46 of fluid housing 18. Pin 228 is provided with a groove 226 in the same manner as previously described pin 128 which receives the free end of the springs. A gasket 234 of any suitable material is provided on leg portion 232 between the head 236 of head and bolt member 230 and one side 238 of back wall 46. Similarly, a washer 240 is provided on leg portion 232 between the other side 242 of back wall 46 and a lock nut 244. Rotation of the leg portion 232 by engaging the flat sides thereof with a wrench or the like will result in pin 228 moving from a first position to the second position, shown in phantom in FIG. 6, thus varying the tension on the spring 122 and correspondingly the operation of valve flap 106. By such an arrangement, the operating characteristics of the fluid coupling can be readily adjustable without the necessity of removing fluid housing 18.

FIG. 7 illustrates a second embodiment of discharge valving in accordance with the present invention which may be used in lieu of the valving shown and disclosed with regard to the embodiment of FIGS. 1–3 and 5. In accordance with this embodiment of the present invention, end plate 324, the equivalent to plate 24 in FIG. 1, is thick enough so that a pair of bores 326 can be machined therein so as to receive round plunger valves 328. Discharge ports 330 are provided in plate 324 for communicating fluid from pumping chambers 74 and 76 with fluid chamber 44. Plunger valves 328 are provided on one side thereof with spring means 332 which bias the valve in opposition to the centrifugal force generated by the rotation of drive member 12 in the same manner as described above with regard to spring 122. The valves 328 are also responsive to the fluid pressure of the pumped fluid by means of branch conduits 334 which communicate with portion 336 of bores 326. The tension of springs 332 can be varied by adjusting the position of caps 338 within the bores 326. In addition, it should be appreciated that the caps are provided with suitable sealing means, not shown, such as an O-ring or the like. The operation of the fluid coupling employing the valving of FIG. 7 is identical to that described above with regard to FIGS. 1–3 and 5.

Thus, it should be appreciated that the present invention provides a fluid coupling device of simple construction which is less complex than known prior art automatic transmission devices. The present invention provides considerable advantages over known transmission devices in that the coupling allows for 1:1 ratio lock up at variable RPM of the drive member thereby eliminating overheating and wear of the fluid coupling device thereby resulting in a correspondingly lower cost of servicing. In addition, the present invention prohibits freewheeling of the device and allows for a braking of the same upon deceleration of the drive member.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fluid coupling comprising a rotatable coupling housing, a drive shaft, a rotary fluid pump means within said housing connected to and rotatable with said drive shaft, a fluid inlet to and a fluid outlet from said housing in fluid circuit with said pump means whereby rotation of said pump means is effective to pump fluid from said inlet to said outlet, a driven shaft, one of said shafts being connected to and rotatably moveable with said housing, valve means associated with said fluid outlet and associated with and rotatably moveable with said drive shaft, said valve means being responsive to the speed of rotation of said drive shaft to move to block said fluid outlet thereby restricting the flow of pumped fluid so as to transmit power from said drive shaft to said driven shaft, and said valve means being further responsive to the pressure of said pumped fluid to move to unblock said fluid outlet.

2. A fluid coupling according to claim 1 wherein said valve means is moved to unblock said fluid outlet by said pumped fluid pressure when said drive shaft and said driven shaft are locked in 1:1 drive ratio.

3. A fluid coupling according to claim 1 wherein said drive shaft is connected to said housing and said means is connected to said housing.

4. A fluid coupling according to claim 1 including valve means associated with said fluid inlet, said valve means being responsive to fluid pressure to prohibit the flow of fluid from said pump means to said inlet upon deceleration of said drive shaft thereby braking and preventing freewheeling of said fluid coupling.

5. A fluid coupling according to claim 1 wherein a plurality of auxiliary inlet ports are employed.

6. A fluid coupling according to claim 1 wherein said pump means includes a pair of meshing gears and said auxiliary ports are spaced a distance of about two gear teeth on either side of said fluid inlet.

7. A fluid coupling according to claim 1 wherein at least one auxiliary inlet port is provided in fluid circuit with said pump means to assure an adequate supply of fluid to said pump means.

8. A fluid coupling according to claim 7 wherein said at least one inlet port feeds fluid to said pump means during both acceleration and deceleration of said drive shaft.

9. A fluid coupling comprising a rotatable coupling housing, a drive shaft, a rotary fluid pump means within said housing connected to and rotatable with said drive shaft, a fluid inlet to and a fluid outlet from said housing in fluid circuit with said pump means whereby rotation of said pump means is effective to pump fluid from said inlet to said outlet, a driven shaft, one of said shafts being connected to and rotatably moveable with said housing, valve means associated with said fluid outlet and associated with and rotatably moveable with said drive shaft, valve means associated with said fluid inlet, said valve means associated with said fluid outlet being responsive to the speed of rotation of said drive shaft to move to block said fluid outlet thereby restricting the flow of pumped fluid so as to transmit power from said drive shaft to said driven shaft, said valve means associated with said fluid outlet being further responsive to the pressure of said pumped fluid to move to unblock said fluid outlet, and said valve means associated with said fluid inlet being responsive to fluid pressure to prohibit the flow of fluid from said pump means to said inlet upon deceleration of said drive shaft thereby braking and preventing freewheeling of said fluid coupling.

10. A fluid coupling according to claim 9 wherein said valve means associated with said outlet is moved to unblock said fluid outlet by said pumped fluid pressure when said drive shaft and said driven shaft are locked in 1:1 drive ratio and further including a plurality of auxiliary inlet ports for feeding fluid to said pump means, said pump means comprising a plurality of meshing gears wherein said auxiliary inlet ports are spaced a distance of about two gear teeth on either side of said fluid inlet.

* * * * *